United States Patent
Yang et al.

(10) Patent No.: US 7,385,537 B2
(45) Date of Patent: Jun. 10, 2008

(54) LINEAR FEEDBACK SHIFT REGISTER FIRST-ORDER NOISE GENERATOR

(75) Inventors: Inging Yang, Milpitas, CA (US); ChienKuo Tien, Cupertino, CA (US)

(73) Assignee: Texas Instruments Incorporated, Dallas, TX (US)

( * ) Notice: Subject to any disclaimer, the term of this patent is extended or adjusted under 35 U.S.C. 154(b) by 594 days.

(21) Appl. No.: 11/068,302

(22) Filed: Feb. 28, 2005

(65) Prior Publication Data
US 2006/0195776 A1    Aug. 31, 2006

(51) Int. Cl.
*H03M 1/20* (2006.01)
(52) U.S. Cl. .................... 341/131; 341/143
(58) Field of Classification Search .......... 341/143, 341/155, 144, 131; 708/250, 252
See application file for complete search history.

(56) References Cited

U.S. PATENT DOCUMENTS

| | | | | |
|---|---|---|---|---|
| 4,467,318 A | * | 8/1984 | Zeitraeg | 341/75 |
| 4,546,446 A | * | 10/1985 | Machida | 708/627 |
| 4,563,546 A | * | 1/1986 | Glitz | 380/268 |
| 6,237,014 B1 | * | 5/2001 | Freidin et al. | 708/422 |
| 6,370,556 B1 | * | 4/2002 | Saramaki et al. | 708/319 |
| 6,459,309 B2 | * | 10/2002 | Canard et al. | 327/115 |
| 6,812,876 B1 | * | 11/2004 | Miller | 341/143 |
| 7,038,607 B2 | * | 5/2006 | Miller | 341/144 |
| 7,084,800 B2 | * | 8/2006 | Miller | 341/144 |
| 7,206,797 B2 | * | 4/2007 | Gressel et al. | 708/250 |

* cited by examiner

*Primary Examiner*—Peguy JeanPierre
(74) *Attorney, Agent, or Firm*—Steven A. Shaw; W. James Brady; Frederick J. Telecky, Jr.

(57) ABSTRACT

A first-order signal generator (135). The generator comprises a shift register (210') having a number N of bit positions. Each bit position is operable to store a binary value, the shift register operable to shift the binary value at each of the bit positions. The generator also comprises circuitry for tapping selected ones of the bit positions and circuitry for applying a function (220') to each binary value in the selected ones of the bit positions to provide a function output. The generator also comprises circuitry for coupling the function output as an input to one of the bit positions. Lastly, the generator also comprises circuitry (230') for outputting a first-order noise signal by coupling, as a twos complement number, each binary value in a plurality of the bit positions.

19 Claims, 3 Drawing Sheets

US 7,385,537 B2

LINEAR FEEDBACK SHIFT REGISTER FIRST-ORDER NOISE GENERATOR

CROSS-REFERENCES TO RELATED APPLICATION

Not Applicable.

STATEMENT REGARDING FEDERALLY SPONSORED RESEARCH OR DEVELOPMENT

Not Applicable.

BACKGROUND OF THE INVENTION

The present embodiments relate to digital circuits and are more specifically directed to a first-order noise generator.

Noise generator output signals are used in various electronic device applications. As one application and detailed later, such a generator may provide a noise signal having a desired frequency profile (i.e., shaped noise) for use in an electronic device, such as in a sigma-delta converter. In this and other applications, various design criteria are often established in connection with implementing the noise generator, and indeed these criteria often apply to other circuitry associated with the application. For example, one criterion is to minimize the amount of power consumed by a device. As other examples, device size, complexity, and cost all should be minimized. As still another example with respect to the various signal generators, a certain frequency response is desired. Particularly in the present context of a first-order noise signal generator, preferably the response curve, over a desired range of frequencies, is such that the response curve changes by 10 dB per every order of magnitude of frequency of interest, where each order of frequency is sometimes referred to as a "decade;" thus, the goal is a frequency response change of 10 dB/decade for a first-order response. The preceding goals have been met to a certain extent in the prior art by implementing a first-order decay signal generator using a number of linear feedback shift registers ("LFSRs") in a single implementation, as further detailed below.

By way of background first to an individual LFSR, FIG. 1 illustrates a single LFSR designated generally at 10. LFSR 10 has N bit positions $B_0$ through $B_{N-1}$, each for storing a binary value of 0 or 1. As a shift register, the device operates in a cycle, typically in response to a clock (not shown), to shift the content of each bit position in a same direction and into a respective adjacent bit position, where the content in one end (e.g., at $B_{N-1}$) is shifted out of the register and the content at the other end (e.g., $B_0$) receives a new input value. Thus, in this example and for sake of uniform discussion in this document, a shift is shown to be from left to right, although the opposite case most certainly may be alternatively implemented by one skilled in the art. In an LFSR, the bit content at selected bit positions ("SBPs") of the register are combined into a function, shown as function $f\{SBPs\}$ and designated at 20 in FIG. 1. The output of function $f\{SBPs\}$ is also input into the register's input bit, which in the present example is bit position $B_0$. Thus, in a given cycle, function $f\{SBPs\}$ is determined, and while each of bit positions $B_0$ through $B_{N-2}$ shifts its content rightward to the next adjacent bit and $B_{N-1}$ shifts its content out of register 10, the result of function $f\{SBPs\}$ is provided as an input to bit position $B_0$. This determination of function $f\{SBPs\}$ and its provision as an input is the feedback function of the LFSR. Note that the function $f\{SBPs\}$ may be determined in various forms, and typically it is implemented as a logical XOR of the SBPs, which are also sometimes referred to as taps, in a given order. The particular positions chosen as the SBPs as well as the exact choice of function $f\{SBPs\}$ vary and may be determined by one skilled in the art from various known or ascertainable resources. Two uses of the contents of LFSR 10 of FIG. 1 are noted with respect to the prior art, as separately described below.

In a first prior art use of LFSR 10, the entire sequence of bits, $B_0$ through $B_{N-1}$ (which may be designated as $[B_0:B_{N-1}]$) may be used as a pseudorandom code generator. Such an application is desirable in telecommunication applications, or elsewhere, where a code is desired that has good auto and cross-correlation properties. When such an application is implemented, the sequence of $[B_0:B_{N-1}]$ as it changes for each cycle of operation provides in effect a white or nearly-white noise signal. To illustrate this aspect, FIG. 2 depicts a plot of the FFT of such a sequence over time, for an example of N=16 and for use of the SBPs of bit positions $B_3$, $B_8$, $B_{14}$, and $B_{15}$, and at a clocking rate of 40 MHz of LFSR 10. As can be readily appreciated, across the depicted frequency spectrum there is a 0 dB response, demonstrating therefore the above-described white noise signal.

A second prior art use of LFSR 10 is now described with reference to FIG. 3. FIG. 3 illustrates a first-order noise generator 30, that is, one that produces an output signal having a decay on the order of 10 dB/decade. Generator 30 includes a number M of LFSRs, each of the general form of LFSR 10 in FIG. 1 and, thus, for sake of reference, shown in FIG. 3 as LFSR $10_0$, $10_1$, and so forth through $10_{M-1}$. While not explicitly shown, note also that each different LFSR$_x$ in FIG. 3 may use different taps as compared to the other LFSRs in generator 30. The output of a same bit position of each LFSR is concatenated into an M-bit register 40, thereby providing a value with bits $V_0$ through $V_{M-1}$; for sake of example, that same bit position in FIG. 3 is shown as the rightmost position (corresponding to position $B_{N-1}$) in FIG. 1. Value $[V_0:V_{M-1}]$ is connected as an input to a first order high pass filter 45, which in response provides an output to a twos complement analyzer 50, the output of which provides a first-order noise signal, FON. The operation of each LFSR $10_x$ in generator 30 is as described in connection with FIG. 1, operating therefore in parallel and in a single cycle to each provide a respective value bit, $V_x$, to register 40. In response, twos complement analyzer 50 interprets the output of first order high pass filter 45 as a twos complement number, and thereby outputs its equivalent such as a signed number as FON. Thus, value $[V_0:V_{M-1}]$ changes for each cycle of operation of the LFSRs $10_0$ through $10_{M-1}$. With this operation and the successive changes in value $[V_0:V_{M-1}]$ as well as the corresponding changes in FON, a first-order response is generated, that is, the changes in FON provide a 10 dB/decade decay if examined in the frequency domain.

While the preceding applications have proven useful in various implementations, recall that design criteria seek to reduce device size, complexity, power consumption, and cost. Given these goals as well as others that may be ascertained by one skilled in the art, there arises a need to improve upon the prior art, as is achieved by the preferred embodiments described below.

BRIEF SUMMARY OF THE INVENTION

In one preferred embodiment, there is a first-order signal generator. The generator comprises a shift register having a number N of bit positions. Each bit position is operable to store a binary value, and the shift register is operable to shift the binary value at each of the bit positions. The generator also comprises circuitry for tapping selected ones of the bit positions and circuitry for applying a function to each binary value in the selected ones of the bit positions to provide a function output. The generator also comprises circuitry for coupling the function output as an input to one of the bit positions. Lastly, the generator also comprises circuitry for outputting a first-order noise signal by coupling, as a twos complement number, each binary value in a plurality of the bit positions.

Other aspects are also disclosed and claimed.

DETAILED DESCRIPTION OF THE INVENTION

Figure 1:
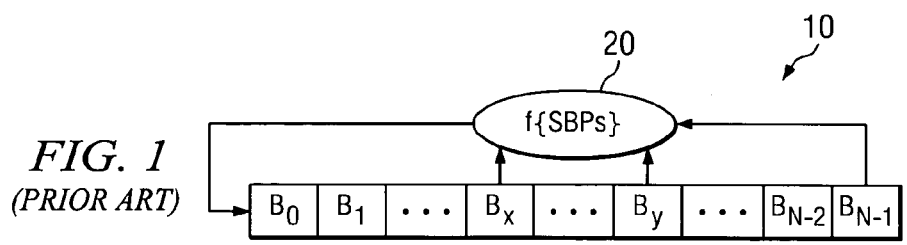
FIG. 1 illustrates a linear feedback shift register ("LFSR") according to the prior art.
Figure 2:
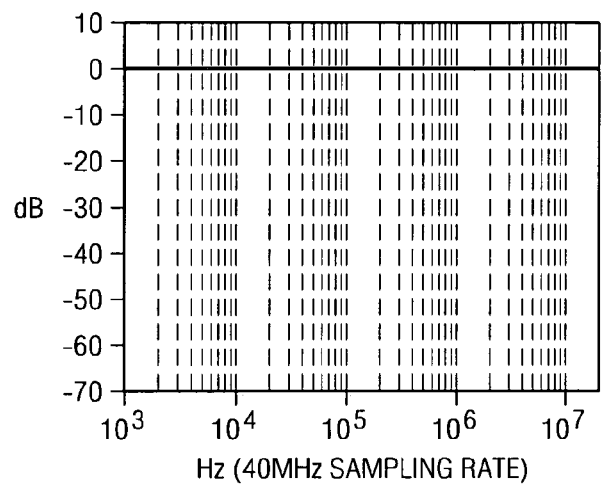
FIG. 2 illustrates a frequency response of the entirety of the bits in prior art LFSR of FIG. 1.
Figure 3:
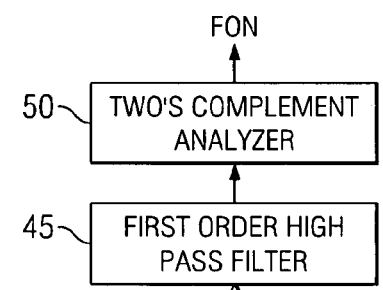
FIG. 3 illustrates an M-bit value generator that provides a first-order decay signal by using M LFSRs according to the prior art.
Figure 3:
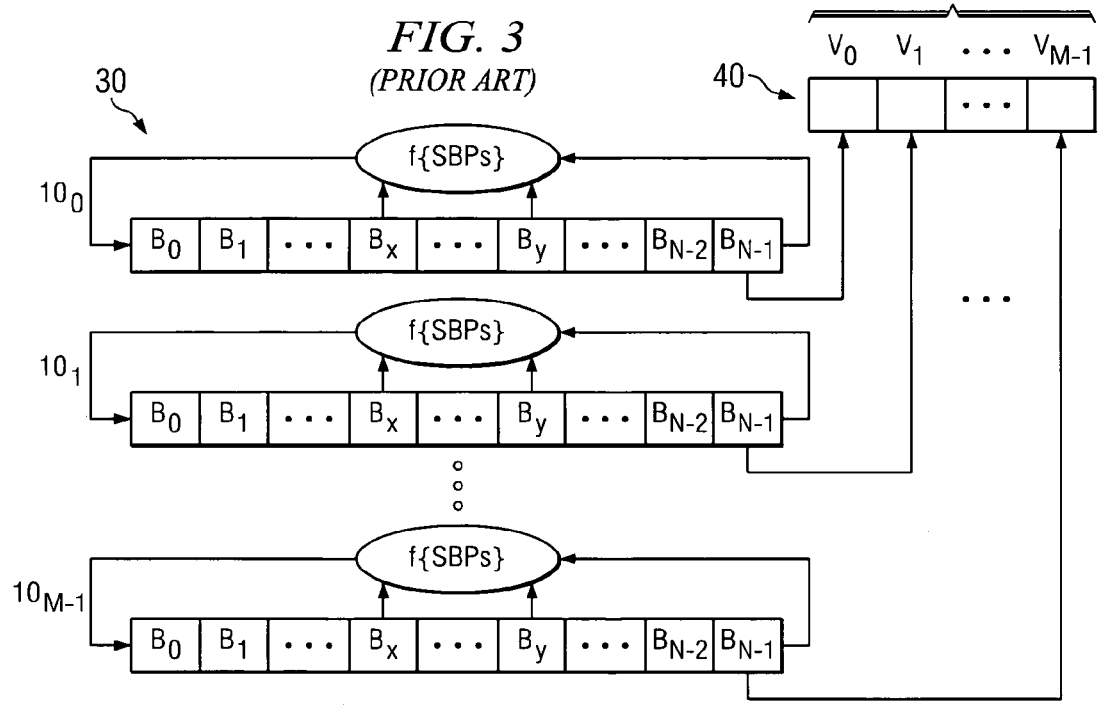

The preferred embodiments are described as implemented into a dither circuit and with a modulator system utilizing that dither circuit. However, it is contemplated that this invention may have benefit in applications other than the specific implementation described in this specification. Accordingly, it is to be understood that the following description is provided by way of example only and is not intended to limit the true scope of this invention as claimed. Additionally, FIGS. 1, 2, and 3 are described in the earlier Background Of This Invention section of this document and the reader is assumed familiar with the principles of that discussion.

Figure 4:
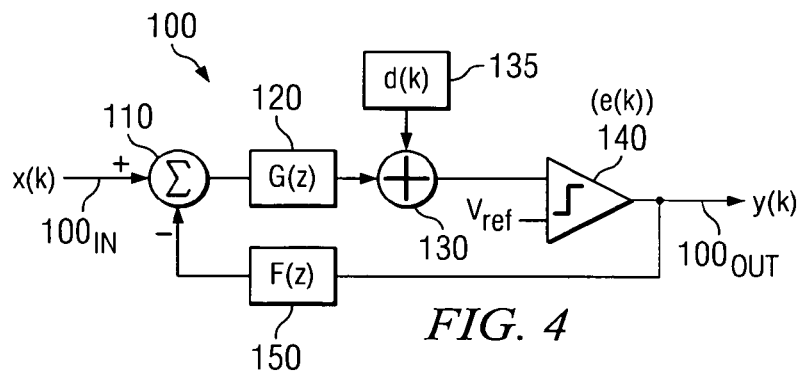
FIG. 4 illustrates a modulator system into which the preferred embodiments may be implemented.

FIG. 4 illustrates a functional block diagram of a single-stage modulator system 100 into which the preferred embodiments may be implemented. In general, system 100 has various aspects known in the art and such a modulator may be implemented in various forms, such as by including it in a digital signal processor ("DSP") or by embodying each functional block in one of various circuits that are implemented by either hardware, software, or a combination thereof. Further, the overall operation of system 100 may be improved by inclusion of a linear feedback shift register first-order noise generator, consistent with the preferred embodiments as detailed later. Before reaching that discussion, however, system 100 in general is described. By way of introduction, system 100 may have many uses. As examples, modulator system 100 may be implemented as a sigma-delta converter, which can be used in an analog-to-digital converter, a digital-to-analog converter, or a fractional-N frequency synthesizer as well as in other quantizing tasks, and often these tasks and hence these devices are included in various electronic products. Sigma-delta converters compare favorably with other data converter technologies in that typically, in the former, a considerable percentage of the transistors are non-critical digital transistors that may be reduced in size, with only a relatively small number of analog transistors. Thus, converters are low cost, and they also provide high dynamic range and flexibility in converting low bandwidth input signals.

Looking now to FIG. 4 in detail, it may be implemented as either an analog or digital system 100 and, thus, is shown and described in general terms to apply to both systems. Thus, system 100 includes an input $100_{IN}$ for receiving an input signal, x(k). Input $100_{IN}$ is connected to a sigma-delta module 110. The output of sigma-delta module 110 is connected as an input to a transfer function block 120, having a transfer function, G(z). Block 120 may be implemented as an accumulator, integrator, or other device with its particular transfer function G(z) depending on the order of the modulator. The output of block 120 is connected as an input to a summing node 130, which also receives as another input a dithering function, d(k) that is provided from a noise generator 135. The output of summing node 130 is connected as an input to a quantizer 140, which in the illustrated instance is shown for sake of a simpler example as a two-level quantizer implemented as a comparator; hence, this comparator has a second input connected to a reference level, $V_{ref}$, which may be ground or some other potential. The output of quantizer 140 provides for system 100 the output $100_{OUT}$ and a corresponding signal, y(k), which may be connected to other circuitry, such as a digital filter (not shown) so as to remove noise outside the band of interest. In addition, output $100_{OUT}$ is also fed back as an input to a transfer function block 150, having a transfer function F(z). Block 150 may be implemented as a digital-to-analog converter ("DAC") or digital filter with its particular transfer function F(z) depending on factors such as the order of the modulator. As further appreciated below, the output of block 150 is connected to sigma-delta module 110, whereby it is subtracted by sigma-delta module 110 from the signal x(k) provided at input $100_{IN}$. Indeed, this operation provides the "sigma" and "delta" aspects, thereby giving rise to the sigma-delta name for system 100.

The operation of system 100 is now described. First, x(k) is provided to input $100_{IN}$. During a first operational cycle, there is no value from the output of transfer function block 150, so x(k) is output by sigma-delta module 110 to accumulator 120. Transfer function block 120 operates based on the transfer function G(z), which in the example as an accumulator combines its input value to the value it accumulated in the preceding cycle; during a first operational cycle, there is no accumulated value and, thus, x(k) is coupled to summing node 130, where it is combined with the dither signal d(k) provided by noise generator 135 as further detailed below, and that combined signal is coupled to quantizer 140. Quantizer 140 compares its input to $V_{ref}$ and if the input is larger than $V_{ref}$, a digital 1 is output, and if the input is less than $V_{ref}$, a digital 0 is output. This value is fed back to transfer function 150, which responds according to F(z); for example, F(z) may represent a digital to analog conversion when system 100 is an analog input device, where the result is connected to sigma-delta module 110 and subtracted from the next value of x(k) coupled to input $100_{IN}$. With the preceding discussion, the operation then continues, but starting with the next cycle, there are now two non-zero values input to sigma-delta module 110 so that it provides the difference thereof and further that value may be accumulated by transfer function block 120 with the value it determined from the preceding cycle. In general, therefore, and as known in the art, over time the loop of system 100 oscillates and the average of y(k) at the digital output $110_{OUT}$ of quantizer 140, providing the output of system 100 as signal y(k), is proportional to the input signal x(k).

The operational effect with respect to system 100 of the dither signal d(k), as provided by noise generator 135, is now further explored. In general, the dither signal d(k) is added to system 100 to reduce the effects of noise and undesirable tones. Specifically, the periodic pattern of operation of a sigma-delta modulator creates so-called spurs in the modulator output signal, which are signal-affecting single frequency tones. Dither is a random-generated noise signal that is added into the signal of system 100 so as to suppress these tones. To further appreciate this aspect, attention is now directed to FIGS. 5a through 5c, each of which depicts frequency along the horizontal axis and the system 100 output signal y(k) along its vertical axis.

Figure 5A:
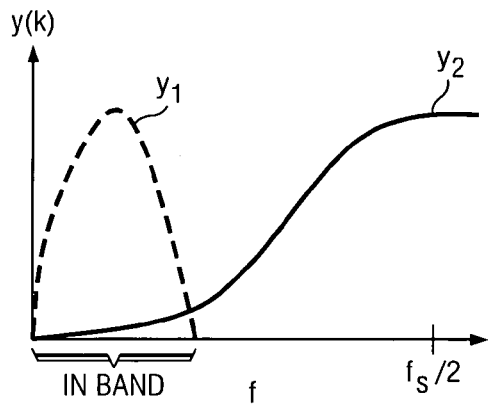
FIG. 5a illustrates the output components of the FIG. 4 system when no dither signal is provided.

Looking first to FIG. 5a, it illustrates the output signal components $y_1$ and $y_2$ when no dither signal is provided, that is, when d(k) is zero. Component $y_1$ is typically bell-shaped and represents the primary data output and occurs in-band, that is, it falls within the band of interest for the system. In addition, however, component $y_2$ represents quantization noise that is caused by the operation of quantizer 140, that is, it represents the error that necessarily arises when an input to quantizer 140 is not exactly equal to a threshold that corresponds to one of its digital outputs. Note that a majority of the noise in component $y_2$ is at frequencies out of the in-band interest frequencies, as is achieved by oversampling of system 100 at a frequency of $f_s$, where $f_s/2$ is also shown in each of FIGS. 5a through 5c. However, some of the noise from component $y_2$ is in the in-band region.

Turning to FIG. 5b, it again illustrates the output signal components $y_1$ and $y_2$, but it also depicts that an additional level of noise is included, as shown by component $y_3$, when the dither signal d(k) is provided as white noise. As stated above, dither is desirable in that it suppresses spur tones, but as seen in FIG. 5b, when dither is provided as white noise, it also introduces additional noise both in-band as well as outside of the in-band frequency range.

Figure 5B:
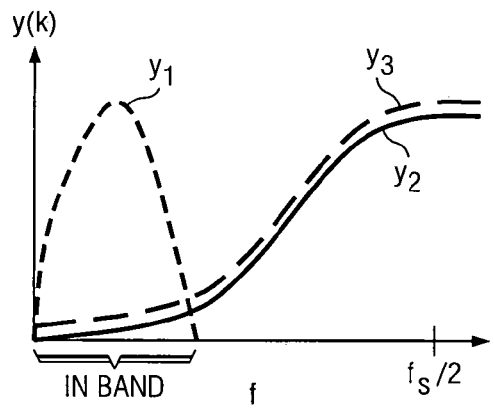
FIG. 5b illustrates the output components of the FIG. 4 system when a white noise dither signal is provided.
Figure 5C:
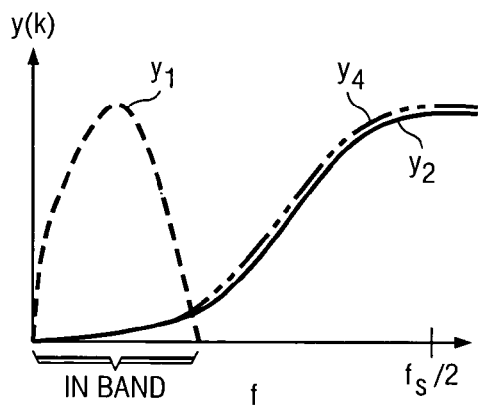
FIG. 5c illustrates the output components of the FIG. 4 system when a first-order noise dither signal is provided.

Turning to FIG. 5c, it once more illustrates the output signal components $y_1$ and $y_2$ of FIGS. 5a and 5b, but it now depicts the effect when the dither signal d(k) is provided as first-order noise, as shown by component $y_4$. By comparing FIG. 5c to FIG. 5b, note that outside the in-band frequency range, noise levels are comparable. However, note inside the in-band frequency range that the noise is reduced in FIG. 5c as compared to FIG. 5b. Thus, the change from white noise dither (FIG. 5b) to first-order noise dither (FIG. 5c) reduces noise in the in-band region, which clearly is a desirable result. As detailed below, the preferred embodiments provide first-order noise dither, which therefore may be used in system 100 to achieve the FIG. 5c benefit or in other applications where a first-order noise generator is beneficial.

Figure 6A:
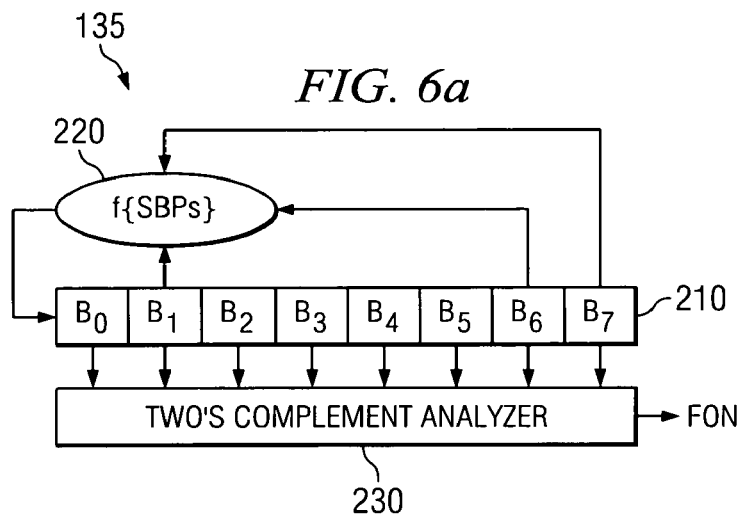
FIG. 6a illustrates a generator of an 8-bit value indicating a first-order noise signal according to the preferred embodiments.

FIG. 6a illustrates noise generator 135 of FIG. 4 in greater detail. Generator 135 includes a linear feedback shift register ("LFSR") 210 that shares various attributes with LFSR 10 of FIG. 1; thus, lesser detail is provided here with respect to the register and the reader is assumed familiar with the principles described earlier. Briefly, then, LFSR 210 has N=8 bit positions, $B_0$ through $B_7$, each for storing a binary value of 0 or 1, and as a shift register, the device operates in each cycle to shift the content of each bit position $[B_0:B_6]$ in a same direction and, hence, into a respective adjacent bit position, while the content of position $B_7$ is shifted out of the register. Moreover, bit content at selected bit positions ("SBPs") of the register are combined into a function, $f\{SBPs\}$, designated generally at 220, and the output of function $f\{SBPs\}$ is also input into the input bit of LFSR 210, which in the present example is bit position $B_0$. The function $f\{SBPs\}$ may be determined in various forms, such as a logical XOR of the SBPs (or "taps") in a particular sequence, where the particular positions chosen as the SBPs as well as the exact choice of function $f\{SBPs\}$ may vary and may be determined by one skilled in the art from various known or ascertainable resources.

Continuing in FIG. 6a with respect to a preferred embodiment, LFSR 210 also includes a twos complement analysis 230, where conductors or the like connect each bit $B_0$ through $B_{N-1}$ of the sequence in LFSR 210 to twos complement analysis 230. As its name suggests, analysis 230 is operable to treat its input as a twos complement number; thus, any input set of bits $[B_0:B_7]$ having a binary 1 in the most significant bit position ("MSB"), which in the present case is bit $B_0$, is treated as a negative number and analysis 230 is operable to treat that number as a signed representation of the positive twos complement of the input value. Thus, analysis 230 is shown to provide an output first-order noise signal, FON, where that signal is intended to represent the bits $[B_0:B_7]$ when treated as a twos complement number. Accordingly, as known in the art, the positive counterpart value of a negative twos complement number (i.e., one with a 1 in its MSB) may be generated by taking the complement of each bit in the negative number, adding one to the result, and considering the binary result as a negative number. Thus, if a given binary number input to analysis 230 has a value of 0 in its MSB, then the number is unchanged and merely represents a positive binary value. Lastly, note therefore that analysis 230 is not necessarily manifested as an operational device but instead represents the function of treating the bits $[B_0:B_7]$ as a twos complement number, as further explored below.

The operation of generator 135 is now described in connection with an example, as presented in the following Table 1.

TABLE 1

| Row | $B_0$ | $B_1$ | $B_2$ | $B_3$ | $B_4$ | $B_5$ | $B_6$ | $B_7$ | FON, signed |
|---|---|---|---|---|---|---|---|---|---|
| 1 | 1 | 0 | 1 | 1 | 1 | 1 | 1 | 1 | −65 |
| 2 | 0 | 1 | 0 | 1 | 1 | 1 | 1 | 1 | 95 |
| 3 | 1 | 0 | 1 | 0 | 1 | 1 | 1 | 1 | −81 |
| 4 | 0 | 1 | 0 | 1 | 0 | 1 | 1 | 1 | 87 |

Particularly, by way of presenting sequences to demonstrate an example although not representing an actual function $f\{SBPs\}$, each row of Table 1 illustrates the content of each bit position $[B_0:B_7]$ for LFSR 210, as well as the twos complement value, FON, corresponding to each row.

Looking now to the rows of Table 1 and starting with Row 1, it depicts the values in LFSR 210 during a given time period, $t_1$. During $t_1$, the MSB of bits $[B_0:B_7]$ is a value of 1 and, thus, the function of analysis 230 implies that a twos complement treatment of those bits concludes that the number is a negative number. Moreover, one skilled in the art may readily confirm that, when treated as a negative number, those bits represent a value for FON of −65, as shown in the right column of Table 1. Accordingly and returning briefly to system 100 of FIG. 4, a representation of −65 is provided as the dither signal, d(k), to summing node 130. After time $t_1$, each bit in LFSR 210 shifts to the right, and the value of $f\{SBPs\}$ is shifted into bit position $B_0$, providing therefore the values shown in Row 2 of Table 2 at a time $t_2$. As was the case during $t_1$, during $t_2$, again all of bits $[B_0:B_7]$ are treated, by the function depicted by analysis 230, as a twos complement value; however, during $t_2$, the MSB of bits $[B_0:B_7]$ is a value of 0 and, thus, the function of analysis 230 implies that a twos complement treatment of those bits concludes that the number is a positive number. Moreover, one skilled in the art may confirm that the positive number presented in Row 2 corresponds to a value of FON equal to 95, as shown in the right column of Table 1. In response, in system 100 of FIG. 4, a representation of 95 is provided as the dither signal, d(k), to summing node 130. From these two examples, one skilled in the art will appreciate from Table 1 that this process continues, with a register right shift and a treatment of bits $[B_0:B_7]$ as the twos complement value equal to −81 during a time $t_3$ and provided as the dither signal, d(k), to summing node 130, and with a register right shift and a twos complement value of 87 determined during a time $t_4$ and provided as the dither signal, d(k), to summing node 130.

Figure 6B:
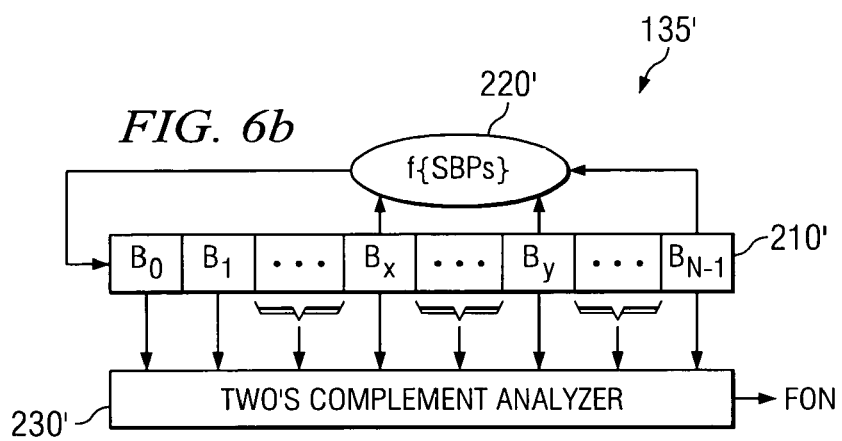
FIG. 6b illustrates a generator of an N-bit value indicating a first-order noise signal according to the preferred embodiments.

FIG. 6b illustrates FIG. 6a illustrates noise generator 135 of FIG. 6a in a more generalized form where an apostrophe is added to various reference numbers to provide a distinction for sake of contrast with FIG. 6a. Thus, in FIG. 6b, a noise generator 135' is shown, and it includes an LFSR 210' with selected taps connected to a function $f\{SBPs\}$ 220'. Further, all N bits of LFSR 210' are connected as inputs to a twos complement analysis 230', and in response analysis 230' provides a first-order noise signal, FON. Thus, FIG. 6b further illustrates that contemplated within the inventive scope is that the number N of bit positions in may be altered by one skilled in the art to be one of many different number of bits, while still achieving the benefits of providing a first-order noise signal.

Figure 7:
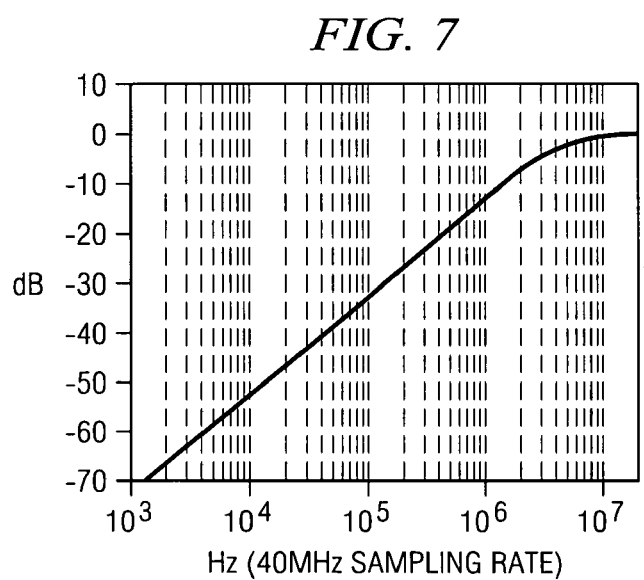
FIG. 7 illustrates a frequency response of the N-bit value in the preferred embodiment LFSR of FIGS. 6a and 6b.

With the operation described above of noise generator 135 or 135', the sequence of output values of FON in the time domain may be analyzed in the frequency domain, with the result of an example of such an analysis shown in FIG. 7. Specifically, FIG. 7 illustrates a plot of an FFT of the sequence of time domain outputs of noise generator 135 or 135', as described above. Particularly, the plot of FIG. 7 corresponds to an LFSR 210' having sixteen bit positions (i.e., N=16), and in this example bit positions $B_3$, $B_8$, $B_{14}$, and $B_{15}$ provide the taps to function $f\{SBPs\}$ and at a sampling rate or 40 MHz. As can be seen by one skilled in the art, across the frequency range of interest, a first-order frequency response is provided. This response approaches the shape of component $y_2$ of FIGS. 5a through 5c, where as a result it also provides the low frequency suppression effect achieved and shown by component $y_4$ in FIG. 5c.

From the above, it may be appreciated that the preferred embodiments provide a novel first-order noise generator, with various benefits over the prior art. For example, in comparing the prior art approach of FIG. 3 with the inventive preferred embodiment of FIGS. 6a and 6b, one skilled in the art will appreciate that the preferred embodiment provides an M-bit first-order noise value, FON, that is generated using less than M LFSRs, whereas for the prior art wherein an M-bit first-order noise value was desired, a total of M LFSRs was required. This is achieved in the preferred embodiments by using more than one bit from an LFSR to generate the value of M, where in the illustrated preferred embodiment, all N bits of a single LFSR are used to correspond to the desired M-bit value used as the first-order noise signal. Thus, in a preferred embodiment, only one LFSR is needed regardless of the value of M. Accordingly, as M increases, a considerable and growing set of benefits are realized. As yet another benefit, the preferred embodiment approach does not require a high pass filter, as is required and shown by filter 45 in FIG. 3 of the prior art. This set of benefits includes a reduction in power consumption, device size, complexity, and cost, as compared to the above-described prior art approach. As another benefit, the preferred embodiments permit a change in M with far less complexity in an overall change in design as would be required by an approach that requires a corresponding change in a number M of LFSRs. The preceding benefits are of considerable value, and one skilled in the art may ascertain still other benefits as well. Thus, the preferred embodiments include various aspects and advantages as compared to the prior art, and still others will be appreciated by one skilled in the art. Moreover, while the preferred embodiments have been shown by way of example, certain other alternatives have been provided and still others are contemplated. Thus, the preceding discussion and these examples should further demonstrate that while the present embodiments have been described in detail, various substitutions, modifications or alterations could be made to the descriptions set forth above without departing from the inventive scope which is defined by the following claims.

The invention claimed is:

1. A first-order signal generator, comprising:
    a shift register having a number N of bit positions, wherein each bit position is operable to store a binary value, the shift register operable to shift the binary value at each of the bit positions;
    circuitry for tapping selected ones of the bit positions;
    circuitry for applying a function to each binary value in the selected ones of the bit positions to provide a function output;
    circuitry for coupling the function output as an input to one of the bit positions; and
    circuitry for outputting a first-order noise signal by coupling, as a twos complement number, each binary value in a plurality of the bit positions.

2. The generator of claim 1 wherein the plurality of the bit positions equals N bit positions.

3. The generator of claim 2 wherein the circuitry for applying a function to each binary value in the selected ones of the bit positions comprises circuitry for applying an XOR operation, in a predetermined order, to each binary value in the selected ones of the bit positions.

4. The generator of claim 3 wherein the circuitry for outputting a first-order noise signal is for outputting, over successive cycles of operation, an M-bit output signal operable to provide a frequency response that changes by approximately, 10 dB per frequency decade.

5. The generator of claim 4 wherein M equals N.

6. The generator of claim 4 wherein M is greater than one and less than N.

7. The generator of claim 4:
    wherein the number N of bit positions may be represented as bit positions $[B_0:B_{15}]$; and
    wherein the selected ones of the bit positions comprise bit positions bit positions $B_3$, $B_8$, $B_{14}$ and $B_{15}$.

8. The generator of claim 1 wherein the circuitry for applying a function to each binary value in the selected ones of the bit positions comprises circuitry for applying an XOR operation, in a predetermined order, to each binary value in the selected ones of the bit positions.

9. The generator of claim 1 wherein the circuitry for outputting a first-order noise signal is for outputting, over successive cycles of operation, an M-bit output signal operable to provide a frequency response that changes by approximately, 10 db per frequency decade.

10. The generator of claim 9:
wherein the number N of bit positions may be represented as bit positions $[B_0:B_{15}]$; and
wherein the selected ones of the bit positions comprise bit positions bit positions $B_3$, $B_8$, $B_{14}$ and $B_{15}$.

11. The generator of claim 9 wherein M equals N.

12. The generator of claim 9 wherein M is greater than one and less than N.

13. The generator of claim 1 wherein M equals N.

14. The generator of claim 1 wherein M is greater than one and less than N.

15. A modulator, comprising:
a dither circuit for providing a dither signal;
an input for receiving an analog input signal;
circuitry for applying a transfer function to the input signal and for providing a first output;
summing circuitry for summing the first output with the dither signal;
a quantizer responsive to the sum of the first output with the dither signal and for outputting a quantized signal; and
circuitry for applying a transfer function to the quantized signal and for providing a second output;
a sigma-delta node for subtracting the first output signal from the analog input signal; and
wherein the dither circuit comprises:
a shift register having a number N of bit positions, wherein each bit position is operable to store a binary value, the shift register operable to shift the binary value at each of the bit positions;
circuitry for tapping selected ones of the bit positions;
circuitry for applying a function to each binary value in the selected ones of the bit positions to provide a function output;
circuitry for coupling the function output as an input to one of the bit positions; and
circuitry for outputting as the dither signal a first-order noise signal by coupling, as a twos complement number, each binary value in a plurality of the bit positions.

16. The modulator of claim 15 wherein the plurality of the bit positions equals N bit positions.

17. The modulator of claim 15 wherein the circuitry for applying a function to each binary value in the selected ones of the bit positions comprises circuitry for applying an XOR operation, in a predetermined order, to each binary value in the selected ones of the bit positions.

18. The modulator of claim 15 wherein the circuitry for outputting a first-order noise signal is for outputting, over successive cycles of operation, an M-bit output signal operable to provide a frequency response that changes by approximately 10 dB per frequency decade.

19. A method of generating a first-order signal, comprising:
operating a shift register having a number N of bit positions, wherein each bit position is operable to store a binary value, to shift the binary value at each of the bit positions;
tapping selected ones of the bit positions;
applying a function to each binary value in the selected ones of the bit positions to provide a function output;
coupling the function output as an input to one of the bit positions; and
outputting a first-order noise signal by coupling, as a twos complement number, each binary value in a plurality of the bit positions.

* * * * *